US012667883B2

(12) United States Patent
Zhang et al.

(10) Patent No.: US 12,667,883 B2
(45) Date of Patent: Jun. 30, 2026

(54) PISTON-TYPE OIL TANK WITH SAFETY VALVE AND A RIVETING TOOL

(71) Applicants: MEISHAN CRRC FASTENING SYSTEM CO., LTD., Meishan (CN); SICHUAN TENGFEIKE TECHNOLOGY CO., LTD., Chengdu (CN)

(72) Inventors: Wenkai Zhang, Chengdu (CN); You Wang, Chengdu (CN); Tao Chen, Chengdu (CN); Chao Guo, Chengdu (CN); Liangjing Wang, Chengdu (CN); Siyu Shi, Chengdu (CN); Song He, Chengdu (CN)

(73) Assignees: MEISHAN CRRC FASTENING SYSTEM CO., LTD., Meishan (CN); SICHUAN TENGFEIKE TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/325,635

(22) Filed: Sep. 11, 2025

(65) Prior Publication Data

US 2026/0008094 A1 Jan. 8, 2026

Related U.S. Application Data

(63) Continuation of application No. PCT/CN2024/088777, filed on Apr. 19, 2024.

(30) Foreign Application Priority Data

Apr. 15, 2024 (CN) ......................... 202410447144.5

(51) Int. Cl.
*B21J 15/20* (2006.01)
*B21J 15/10* (2006.01)
(Continued)

(52) U.S. Cl.
CPC ............ *B21J 15/105* (2013.01); *B21J 15/20* (2013.01); *B21J 15/26* (2013.01); *B21J 15/28* (2013.01); *F15B 1/26* (2013.01)

(58) Field of Classification Search
CPC .. B21J 15/20; B21J 15/26; B21J 15/28; F15B 1/26
See application file for complete search history.

(56) References Cited

U.S. PATENT DOCUMENTS 4,628,722 A * 12/1986 Mauer ..................... B21J 15/32 227/112
4,630,460 A * 12/1986 Mauer .................... B21J 15/043 72/453.17

(Continued)

FOREIGN PATENT DOCUMENTS

CN 105041760 A 11/2015
CN 113217482 A 8/2021

(Continued)

*Primary Examiner* — Nathaniel C Chukwurah
(74) *Attorney, Agent, or Firm* — NKL Law; Allen Xue

(57) ABSTRACT

A piston-type oil tank with safety valve have a tank body, a separator piston arranged inside the tank body, and an oil inlet and an air outlet provided at the front and rear ends of the separator piston respectively. The separator piston is arranged with a penetrated safety valve core, a support frame is arranged at the end of the safety valve core facing the air outlet, and a stop plate is provided at the end of the safety valve core facing the oil inlet. An oil discharge groove is provided on the side wall of the safety valve core. When the support frame presses against the end face where the air outlet is located, the oil discharge groove connects the spaces on both sides of the separator piston, and an oil outlet gap is reserved between the support frame and the end face where the air outlet is located.

9 Claims, 7 Drawing Sheets

(51) Int. Cl.

| | |
|---|---|
| ***B21J 15/26*** | (2006.01) |
| ***B21J 15/28*** | (2006.01) |
| ***F15B 1/26*** | (2006.01) |

(56) References Cited

U.S. PATENT DOCUMENTS 6,779,343 B2 * 8/2004 Sawdon .............. F15B 11/0325 60/563
7,503,196 B2 * 3/2009 Chitty ...................... B21J 15/10 72/21.4

FOREIGN PATENT DOCUMENTS

CN 115319009 A 11/2022
CN 218016777 U 12/2022
GB 2045673 A 11/1980

* cited by examiner

PISTON-TYPE OIL TANK WITH SAFETY VALVE AND A RIVETING TOOL

TECHNICAL FIELD OF THE INVENTION

The present invention relates to the technical field of riveting tools, specifically to a piston-type oil tank with safety valve and a riveting tool.

BACKGROUND OF THE INVENTION

Existing electro-hydraulic riveting tools, as described in the Chinese patent application, Publication No. CN115319009A, require an oil tank to store oil, where the oil enters the riveting working head to drive the working head piston inside the riveting working head to move back and forth, thereby completing the riveting action.

The diaphragm-type oil tanks are used for the oil tank on existing electro-hydraulic riveting tools, where an air bag connected to the atmosphere is provided inside the oil tank to maintain pressure balance between the oil and the atmosphere while separating the atmosphere from the oil, to prevent cavitation caused when gas mixing into the oil.

However, due to the significant instantaneous pressure changes in oil within the electro-hydraulic riveting tool, high impact will be caused on the air bag upon sudden pressure increase or decrease, reducing the service life of the air bag and even causing it to rupture.

BRIEF DESCRIPTION OF THE INVENTION

The purpose of the present invention is to provide a piston-type oil tank with safety valve and a riveting tool, which have a longer service life and higher safety.

To solve the above technical problems, the present invention applies the following solutions:

In the first aspect, a piston-type oil tank with safety valve comprises a tank body, with a separator piston arranged the tank body, and also an oil inlet and an air outlet provided at the front and rear ends of the separator piston respectively. A sealing element is arranged between the separator piston and the tank body to isolate oil in the oil tank from air outside. Its function is that by the replacement of the air bag with the separator piston, the separator piston may withstand greater impact exerted by pressure change and is not prone to damage, as such the overall oil tank has an extended service life and a reduced maintenance frequency. Through the arrangement of the oil outlet and the air outlet, both oil and air are capable of entering the oil tank and being used to balance the oil pressure and the atmospheric pressure on either side of the separator piston. When the oil pressure in the oil tank is higher than the air pressure, the oil pushes the separator piston to move toward the air outlet. When the oil pressure in the oil tank is lower than the air pressure, the air pushes the separator piston to move toward the oil inlet.

Furthermore, the separator piston is penetrated with a safety valve core parallel to the shaft of the separator piston, a support frame is arranged at the end of the safety valve core facing the air outlet, and a stop plate is provided at the end of the safety valve core facing the oil inlet, with the length of the safety valve core greater than that of the separator piston; an oil discharge groove is provided on the side wall of the safety valve core, and when the support frame presses against the end face where the air outlet is located, the oil discharge groove interconnects the spaces on both sides of the separator piston, and an oil outlet gap is reserved between the support frame and the end face where the air outlet is located. The oil discharge groove extends axially along the safety valve core. Its function is to limit the movement range of the separator piston on the safety valve core between the support frame and the stop plate through the design of the safety valve core, the support frame and the stop plate. When excessive oil pressure develops in the oil tank, the separator piston is pushed toward an end face where the air outlet is located. When the support frame is compressed on the end face where the air outlet is located, the oil continues to push the separator piston to move toward the air outlet, separating the stop plate from an end face of the separator piston facing the oil inlet and positioning front and rear ends of the oil discharge groove on front and rear sides of the separator piston, respectively. In this way, the oil flows through the oil discharge groove to another side of the separator piston and the oil creating excessive pressure is discharged through the air outlet, so as to achieve the effect of reducing the excessive oil pressure in the oil tank.

Furthermore, a return spring sleeving the safety valve core is provided between the support frame and the separator piston. Its function is that by the arrangement of the return spring, the separator piston is configured to be reset to an end of the safety valve core that is close to the stop plate when the oil pressure in the oil tank is insufficient, so that the oil discharge groove is positioned on a side of the separator piston facing the support frame to discontinue oil discharge through the oil discharge groove.

Furthermore, a sealing ring is provided on the section of the safety valve core between the stop plate and the oil discharge groove. During the process of shortening the distance between the separator piston and the support frame, the sealing ring moves out of the separator piston. The end of the separator piston facing the oil inlet is designed with a diameter-expanding hole at a gap between the safety valve core and the separator piston, and the inner diameter of the diameter-expanding hole is gradually reduced in the direction towards the support frame from the stop plate. Its function is that by the arrangement of the sealing ring, the oil discharge groove is further separated from oil when the sealing ring is located in the separator piston. As the sealing ring located in the separator piston is compressed and tightly fit onto an inner wall of the separator piston, the arrangement of the diameter-expanding hole provides a smooth transition when the sealing ring moves out.

Furthermore, a rear cap plate is provided at a rear end of the tank body and designed with the air outlet. A positioning ring matching an inner wall of the tank body is provided on an end face of the rear cap plate facing the separator piston. A rear support ring configured to support on the positioning ring is provided on an end face of the separator piston facing the rear cap plate, and the inner diameter of the rear support ring is larger than the outer diameter of the support frame. Its function is to limit the movement distance of the separator piston at the rear end of the tank body through arrangement of the rear cap plate and the rear support ring.

Furthermore, a front cap plate is provided at a front end of the tank body and designed with the oil inlet. A mounting base for installing the tank body on the riveting tool is provided on a surface of the front cap plate. The oil inlet extends from outside of the mounting base into the tank body. An oil replenishing inlet communicated with the tank body is provided on the front cap plate, with an oil replenishing plug provided in the oil replenishing inlet. Its function is that since part of oil has been discharged through the air outlet when the excessive oil pressure developed in the oil tank, through arrangement of the oil replenishing inlet and the oil replenishing plug, when the oil pressure in the oil tank is insufficient, the oil replenishing plug is removed to replenish oil into the oil tank through the oil replenishing inlet.

Furthermore, a sealing tube base is provided between the tank body and the front cap plate, and a tightening rod is connected between the front cap plate and the rear cap plate to fix the distance therebetween. The tightening rod comprises a rod body threaded onto the front cap plate and extending through the rear cap plate, and a tightening nut threaded onto the section of the rod body extending through the rear cap plate. Its function is that by the arrangement of the tightening rod, the front cap plate, the sealing tube base, the tank body, and the rear cap plate are tightly connected to prevent oil leakage from the connection gaps.

Furthermore, a sleeve ring matching the inner wall of the tank body is provided on an end face of the sealing tube base facing the separator piston. A front support ring configured to support on the sleeve ring is provided on the end face of the separator piston facing the front cap plate, and the outer diameter of the front support ring is larger than the inner diameter of the sleeve ring. Its function is to limit the movement distance of the separator piston at the front end of the tank body through arrangement of the sleeve ring and the front support ring.

Furthermore, a magnet is provided on a side of the safety valve core facing the front cap plate, and a sensor for detecting the position of the magnet is provided on the front cap plate. The sensor adopts the prior art and is not described here. Its function is that by the arrangement of the magnet and the sensor, when the oil in the oil tank is insufficient, the magnet approaches the sensor and triggers it to send a signal of insufficient oil quantity to the control system.

In the second aspect, a riveting tool comprises the aforementioned piston-type oil tank with safety valve and also a pump body, wherein the tank body is connected to the pump body. The pump body is communicated with a riveting working head, and both adopt the prior art. By communicating the tank body with the pump body and the pump body with the riveting working head, the oil in the tank body may enter the riveting working head through the pump body and serve as a medium for driving a working head piston in the riveting working head to move.

Furthermore, the tank body comprises a front cap plate designed with the oil inlet. A mounting base is disposed on the surface of the front cap plate and connected to the pump body.

The present invention has the following beneficial effects:

1. The air bag is replaced with the separator piston. The separator piston may withstand greater impact exerted by pressure change and is not prone to damage, as such the overall oil tank has an extended service life and a reduced maintenance frequency.
2. Through arrangement of the oil outlet and the air outlet, both oil and air are capable of entering the oil tank and being used to balance the oil pressure and the atmospheric pressure on either side of the separator piston. When the oil pressure in the oil tank is higher than the air pressure, the oil pushes the separator piston to move toward the air outlet. When the oil pressure in the oil tank is lower than the air pressure, the air pushes the separator piston to move toward the oil inlet.
3. The movement range of the separator piston on the safety valve core is limited between the support frame and the stop plate through the design of the safety valve core, the support frame and the stop plate. When excessive oil pressure develops in the oil tank, the separator piston is pushed toward the end face where the air outlet is located. When the support frame is compressed on the end face where the air outlet is located, the oil continues to push the separator piston to move toward the air outlet, separating the stop plate from the end face of the separator piston facing the oil inlet and positioning front and rear ends of the oil discharge groove on front and rear sides of the separator piston, respectively. In this way, the oil flows through the oil discharge groove to another side of the separator piston and the oil creating excessive pressure is discharged through the air outlet, so as to achieve the effect of reducing the excessive oil pressure in the oil tank.

Figure 1:
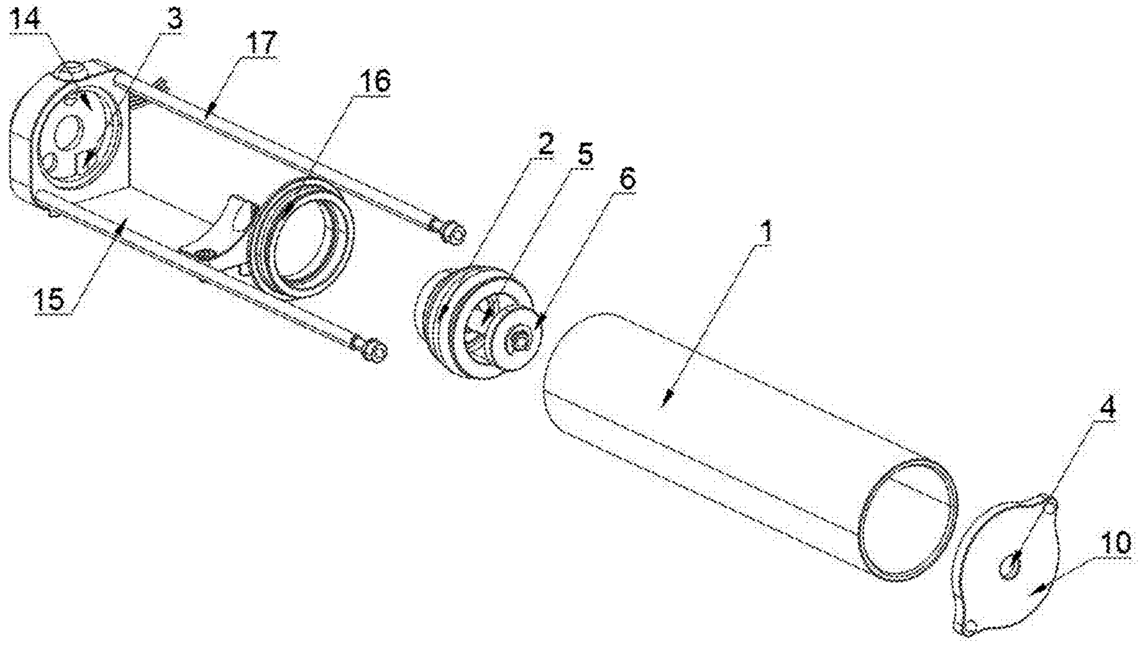
FIG. 1 is a stereoscopic exploded structural diagram of the oil tank in Embodiment 1.

Reference numerals: 1. tank body; 2. separator piston; 3. oil inlet; 4. air outlet; 5. safety valve core; 6. support frame; 7. stop plate; 8. oil outlet gap; 9. diameter-expanding hole; 10. rear cap plate; 11. positioning ring; 12. rear support ring; 13. sealing ring; 14. front cap plate; 15. mounting base; 16. sealing tube base; 17. tightening rod; 18. sleeve ring; 19. front support ring; 20. pump body; 21. oil replenishing inlet; 22. oil replenishing plug; 23. oil discharge groove; 24. return spring; 25. magnet; 26. sensor.

DETAILED DESCRIPTION OF EMBODIMENTS

The present invention is further described in detail in combination with embodiments and accompanying drawings, and the implementation of the present invention is not limited thereto.

For description of the present invention, it should be noted that orientation or position relations indicated by the terms "center", "above", "under", "left", "right", "vertical", "longitudinal", "lateral", "horizontal", "inside", "outside", "front", "rear", "top", "bottom", etc. are based on the orientation or position relations shown in the drawings or the commonly arranged orientation or position relations as used in the application, and they are only used to describe the present invention and simplify description herein but not to indicate or imply that the device or component indicated must have a specific orientation and be constructed and operated in a specific orientation.

Therefore, they shall not be construed as a limitation hereto.

For description of the present invention, it should be also noted that, unless otherwise specified and defined explicitly, the terms "arrangement", "configuration", "assembly", "linking" and "connection" shall be comprehend in a broad sense, for example, it can be fixed connection, and can also be removable connection, or integral connection; can be mechanical connection, and can also be electrical connection; can be direct linking, and can be indirect linking through an intermediary, or communication in two pieces. Those of ordinary skill in the art can understand the specific meanings of these terms in the present invention according to actual conditions.

Embodiment 1

In the first aspect, as shown in FIG. 1, a piston-type oil tank with safety valve comprises a tank body 1, wherein the tank body 1 is provided with a separator piston 2, and also comprises an oil inlet 3 and an air outlet 4 arranged at front and rear ends of the separator piston 2, respectively. A scaling piece is provided between the separator piston 2 and the tank body 1 to separate the oil in the oil tank from external air. The sealing piece is located between a front support ring 19 and a rear support ring 12. Its function is that by the replacement of the air bag with the separator piston 2, the separator piston 2 may withstand greater impact exerted by pressure change and is not prone to damage, as such the overall oil tank has an extended service life and a reduced maintenance frequency. Through the arrangement of the oil outlet and the air outlet, both oil and air are capable of entering the oil tank and being used to balance the oil pressure and the atmospheric pressure on either side of the separator piston 2. When the oil pressure in the oil tank is higher than the air pressure, the oil pushes the separator piston 2 to move toward the air outlet 4. When the oil pressure in the oil tank is lower than the air pressure, the air pushes the separator piston 2 to move toward the oil inlet 3.

The separator piston 2 comprises a close-contact segment tightly fit onto the safety valve core 5. A clearance groove is provided on the section of the separator piston 2 where the close-contact segment is located, allowing the close-contact segment to flip outward. The clearance groove encircles an outer wall of the close-contact segment. A sealing ring is arranged on an outer wall of the separator piston 2 and forms an interference fit with an interior of the tank body 1. The scaling ring is located between the front support ring 19 and the rear support ring 12, and outer diameters of the front support ring 19 and the rear support ring 12 are smaller than that of the sealing ring.

Figure 2:
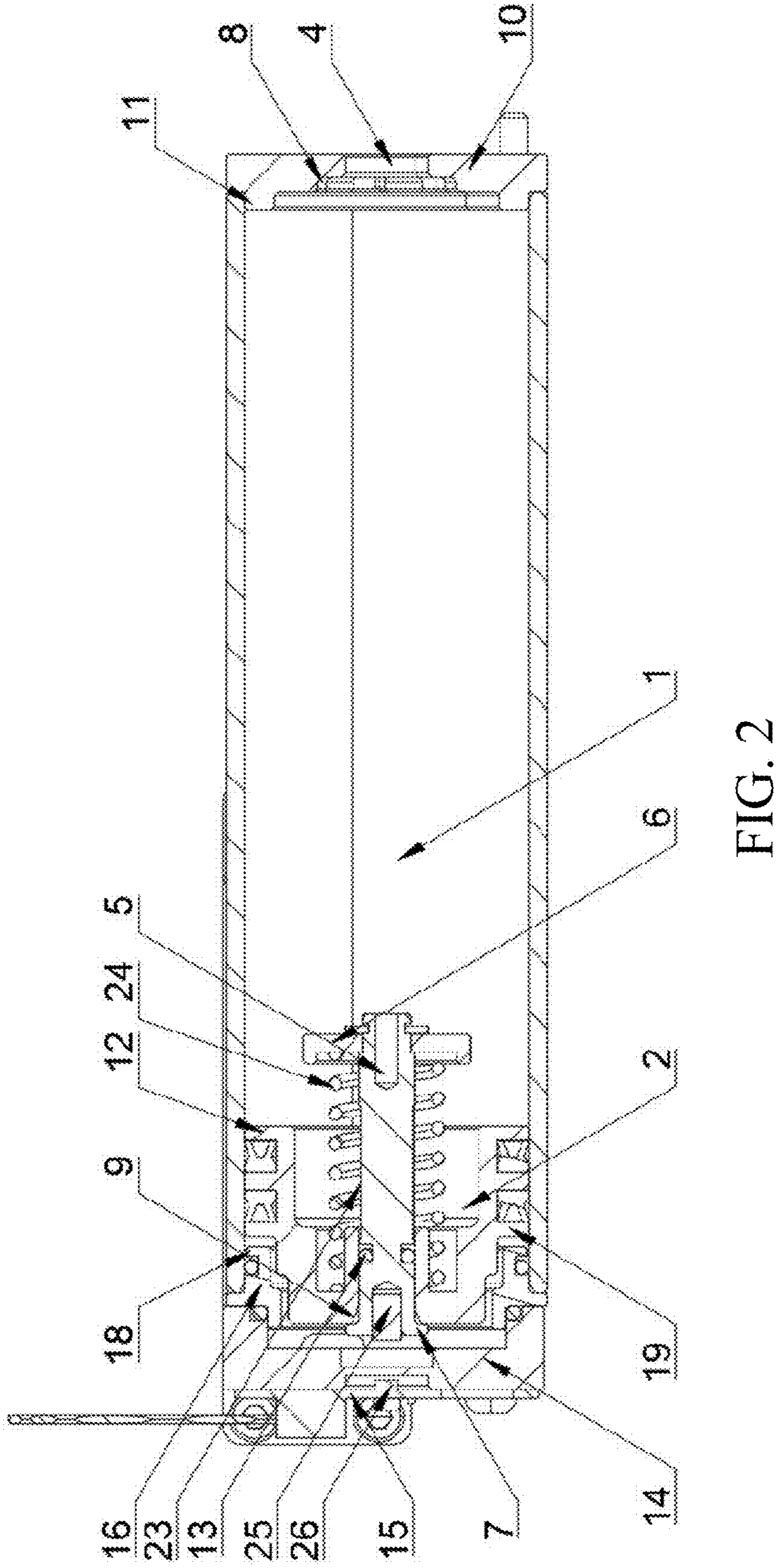
FIG. 2 is a top sectional structural diagram of the oil tank in Embodiment 1 under low oil pressure.

Specifically, as shown in FIG. 2, the safety valve core 5 is disposed to extend through the separator piston 2 in a direction axially parallel to the separator piston 2. A support frame 6 is provided at the end of the safety valve core 5 facing the air outlet 4, and a stop plate 7 is provided at the end of the safety valve core 5 facing the oil inlet 3. The length of the safety valve core 5 exceeds that of the separator piston 2. An oil discharge groove 23 is provided on a sidewall of the safety valve core 5. When the support frame 6 is compressed on an end face where the air outlet 4 is located, an oil outlet gap 8 is maintained between the support frame 6 and the end face where the air outlet 4 is located. The oil discharge groove 23 extends axially along the safety valve core 5. Its function is to limit the movement range of the separator piston 2 on the safety valve core 5 between the support frame 6 and the stop plate 7 through the design of the safety valve core 5, the support frame 6 and the stop plate 7. When excessive oil pressure develops in the oil tank, the separator piston 2 is pushed toward the end face where the air outlet 4 is located. When the support frame 6 is compressed on the end face where the air outlet 4 is located, the oil continues to push the separator piston 2 to move toward the air outlet 4, separating the stop plate 7 from an end face of the separator piston 2 facing the oil inlet 3 and positioning front and rear ends of the oil discharge groove 23 on front and rear sides of the separator piston 2, respectively. In this way, the oil flows through the oil discharge groove 23 to another side of the separator piston 2 and the oil creating excessive pressure is discharged through the air outlet 4, so as to achieve the effect of reducing the excessive oil pressure in the oil tank.

Specifically, as shown in FIG. 2, a return spring 24 sleeving the safety valve core 5 is provided between the support frame 6 and the separator piston 2. Its function is that by the arrangement of the return spring 24, the separator piston 2 is configured to be reset to an end of the safety valve core 5 that is close to the stop plate 7 when the oil pressure in the oil tank is insufficient, so that the oil discharge groove 23 is positioned on a side of the separator piston 2 facing the support frame 6 to discontinue oil discharge through the oil discharge groove 23.

Figure 3:
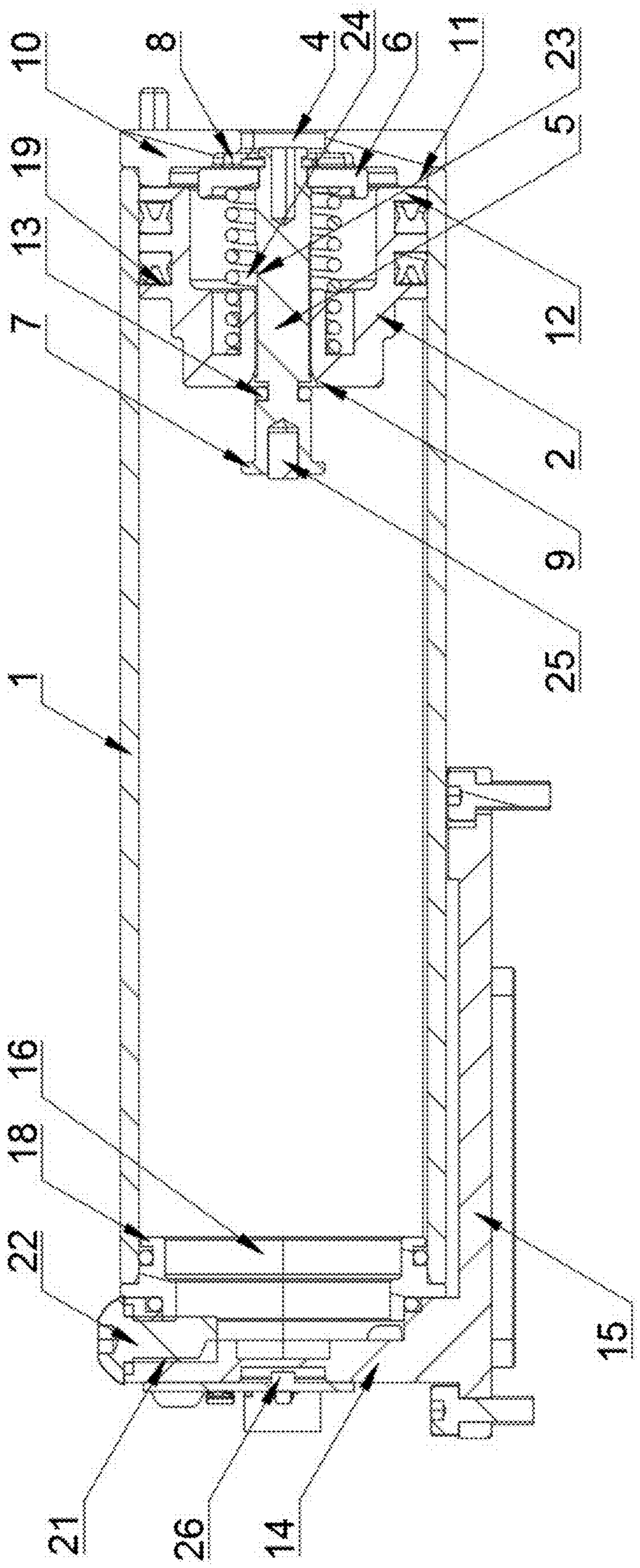
FIG. 3 is a front sectional structural diagram of the oil tank in Embodiment 1 under high oil pressure.
Figure 5:
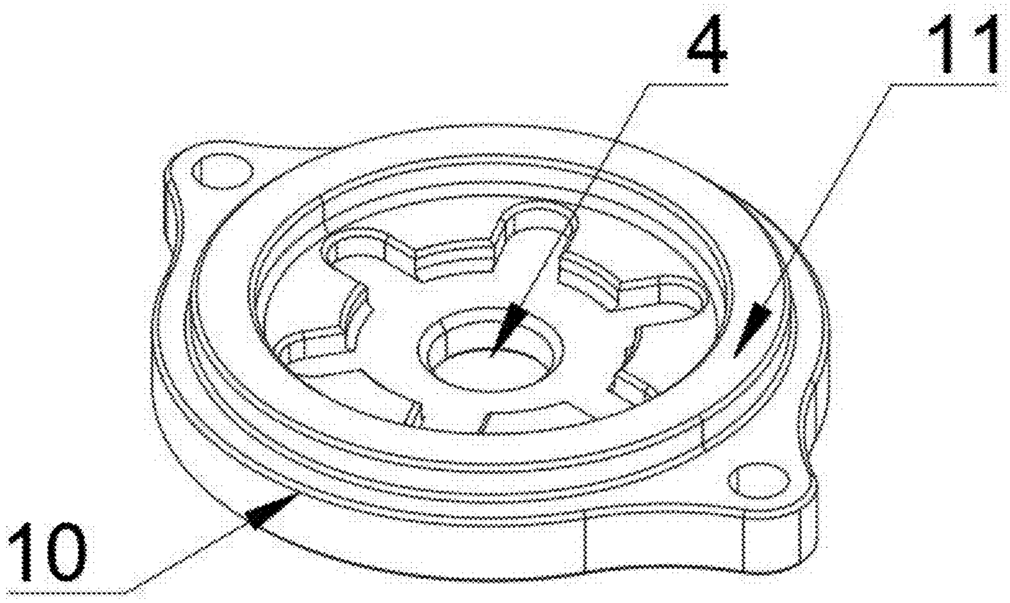
FIG. 5 is a stereoscopic structural diagram of the rear cap plate in Embodiment 1.

Specifically, as shown in FIG. 3, a sealing ring 13 is provided on the section of the safety valve core 5 between the stop plate 7 and the oil discharge groove 23. During the process of shortening the distance between the separator piston 2 and the support frame 6, the sealing ring 13 moves out of the separator piston 2. The end of the separator piston 2 facing the oil inlet 3 is designed with a diameter-expanding hole 9 at a gap between the safety valve core 5 and the separator piston 2, and the inner diameter of the diameter-expanding hole 9 is gradually reduced in the direction towards the support frame 6 from the stop plate 7. An outer wall of the safety valve core 5 is circumferentially designed with a groove for embedding the sealing ring 13. Its function is that by disposing the sealing ring 13, the oil discharge groove 23 is further separated from oil when the sealing ring 13 is located in the separator piston 2. As the sealing ring 13 located in the separator piston 2 is compressed and tightly fit onto an inner wall of the separator piston 2, the arrangement of the diameter-expanding hole 9 provides a smooth transition when the sealing ring 13 moves out. Specifically, as shown in FIG. 5, a rear cap plate 10 is provided at the rear end of the tank body 1 and designed with the air outlet 4. A positioning ring 11 matching an inner wall of the tank body 1 is provided on an end face of the rear cap plate 10 facing the separator piston 2. A rear support ring 12 configured to support on the positioning ring 11 is provided on an end face of the separator piston 2 facing the rear cap plate 10, and the inner diameter of the rear support ring 12 is larger than the outer diameter of the support frame 6. Its function is to limit the movement distance of the separator piston 2 at the rear end of the tank body 1 through arrangement of the rear cap plate 10 and the rear support ring 12.

The rear cap plate 10 is provided with an oil drain groove connected to the air outlet 4. An outer diameter of the oil drain groove is smaller than that of the support frame 6. An oil passage groove is connected to an outer wall of the oil drain groove and coaxially disposed with both the separator piston 2 and the support frame 6. The maximum center distance between the oil passage groove and the oil drain groove exceeds the outer diameter of the support frame 6. The oil outlet gap 8 is jointly formed by a gap between the support frame 6 and the rear support ring 12, a gap between the oil passage groove and the support frame 6, and the oil drain groove.

Figure 4:
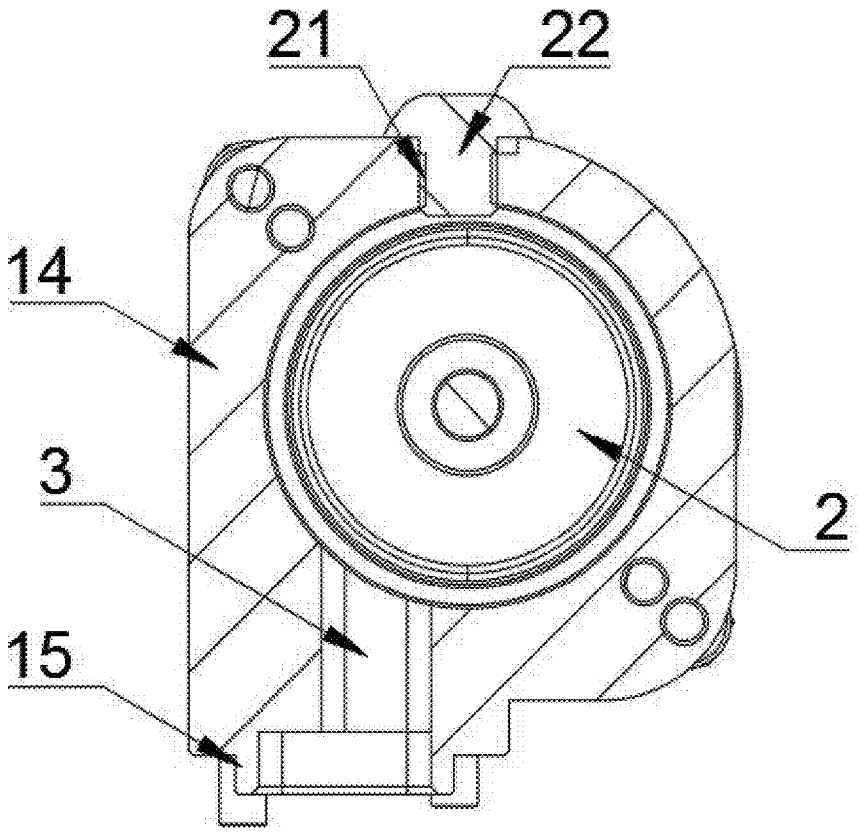
FIG. 4 is a left sectional structural diagram of the front cap plate of the oil tank in Embodiment 1.

Specifically, as shown in FIG. 4, a front cap plate 14 is provided at the front end of the tank body 1 and designed with the oil inlet 3. A mounting base 15 for installing the tank body 1 on the riveting tool is provided on a surface of the front cap plate 14. The oil inlet 3 extends from outside of the mounting base 15 into the tank body 1. An oil replenishing inlet communicated with the tank body 1 is provided on the front cap plate 14, with an oil replenishing plug provided in the oil replenishing inlet. Its function is that since part of oil has been discharged through the air outlet when the excessive oil pressure developed in the oil tank, through arrangement of the oil replenishing inlet and the oil replenishing plug, when the oil pressure in the oil tank is insufficient, the oil replenishing plug is removed to replenish oil into the oil tank through the oil replenishing inlet.

Specifically, as shown in FIG. 3, a sealing tube base 16 is provided between the tank body 1 and the front cap plate 14, and a tightening rod 17 is connected between the front cap plate 14 and the rear cap plate 10 to fix the distance therebetween. The tightening rod 17 comprises a rod body threaded onto the front cap plate 14 and extending through the rear cap plate 10, and a tightening nut threaded onto the section of the rod body extending through the rear cap plate 10. Its function is that by the arrangement of the tightening rod 17, the front cap plate 14, the sealing tube base 16, the tank body 1, and the rear cap plate 10 are tightly connected to prevent oil leakage from the connection gaps.

Specifically, as shown in FIG. 3, a sleeve ring 18 matching the inner wall of the tank body 1 is provided on an end face of the sealing tube base 16 facing the separator piston 2. A front support ring 19 configured to support on the sleeve ring 18 is provided on an end face of the separator piston 2 facing the front cap plate 14, and the outer diameter of the front support ring 19 is larger than the inner diameter of the sleeve ring 18. Its function is to limit the movement distance of the separator piston 2 at the front end of the tank body 1 through arrangement of the sleeve ring 18 and the front support ring 19.

Specifically, as shown in FIG. 2, a magnet 25 is provided on a side of the safety valve core 5 facing the front cap plate 14, and a sensor 26 for detecting the position of the magnet 25 is provided on the front cap plate 14. The sensor 26 adopts the prior art and is not described here. Its function is that by the arrangement of the magnet 25 and the sensor 26, when the oil in the oil tank is insufficient, the magnet 25 approaches the sensor 26 and triggers it to send a signal of insufficient oil quantity to the control system.

Figure 6:
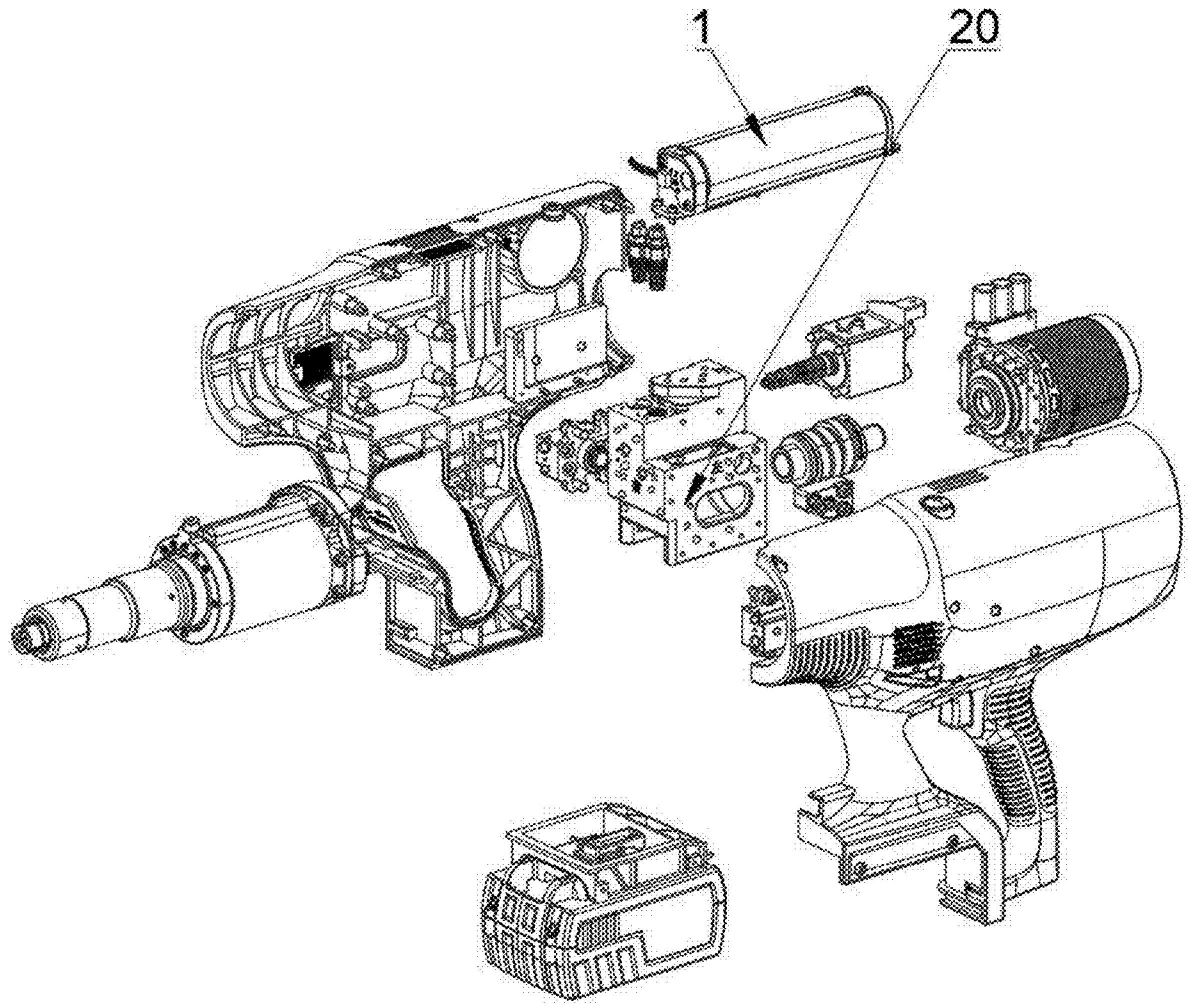
FIG. 6 is a stereoscopic exploded structural diagram of the riveting tool in Embodiment 1.
Figure 7:
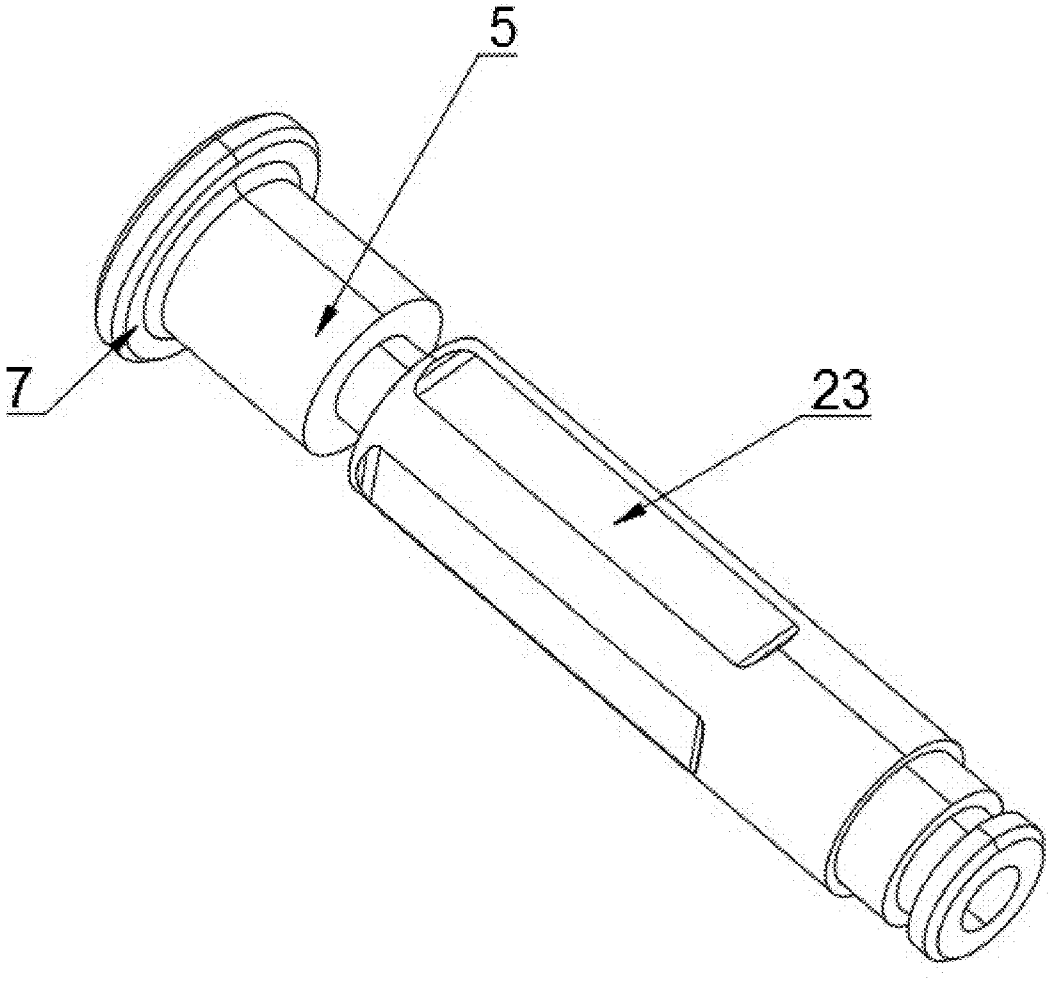
FIG. 7 is a stereoscopic structural diagram of the safety valve core in Embodiment 1.

In the second aspect, as shown in FIG. 6, a riveting tool comprises the aforementioned piston-type oil tank with safety valve and also a pump body 20, wherein the tank body 1 is communicated with the pump body 20. The pump body 20 is communicated with a riveting working head, and both adopt the prior art. By communicating the tank body 1 with the pump body 20 and the pump body 20 with the riveting working head, the oil in the tank body 1 may enter the riveting working head through the pump body 20 and serve as a medium for driving a working head piston in the riveting working head to move.

The tank body 1 comprises a front cap plate 14 designed with the oil inlet 3. A mounting base 15 is disposed on the surface of the front cap plate 14 and connected to the pump body 20.

The working principle of the present embodiment is as follows: During the riveting operation with the riveting working head, the oil pressure within pump body 20 fluctuates, consequently affecting the oil pressure in the oil tank. When the oil pressure in the oil tank is balanced with the atmospheric pressure, the separator piston 2 remains stationary.

When the excessive oil pressure develops in the oil tank, the oil pushes the separator piston 2 toward the air outlet 4. As the separator piston 2 moves on the safety valve core 5 from the vicinity of the stop plate 7 toward the support frame 6, the sealing ring 13 and an end of the oil discharge groove 23 that is close to the stop plate 7 sequentially move out of the diameter-expanding hole 9, so that the oil discharge groove 23 communicates the front and rear ends of the separator piston 2, and an appropriate amount of oil is discharged to reduce oil pressure and improve the safety of the riveting tool.

The above-mentioned embodiments are only preferred embodiments of the present invention and are not restricted thereto in any way. Any simple modification, equivalent replacement and alteration made to these embodiments within the spirit and rule of the present invention based on the technical essence thereof shall be incorporated in the protection scope of the technical solutions of the present invention.

The invention claimed is:

1. A piston-type oil tank with safety valve, comprising:
a tank body (1) housing a separator piston (2), and
a first end plate provided with an oil inlet (3) and a second end plate provided an air outlet (4), the first end plate and the second end plate being disposed at a front end and a rear end of the tank body (1), respectively,
wherein a safety valve core (5) extends through the separator piston (2) in a direction parallel to an axial direction of the tank body (1),
wherein the safety valve core (5) comprises a support frame (6) disposed at a first end proximate to the air outlet (4) and a stop plate (7) disposed at a second end proximate to the oil inlet (3),
wherein a length of the safety valve core (5) exceeds that of the separator piston (2), and a sidewall of the safety valve core (5) is provided with an oil discharge groove (23), and
wherein, when the support frame (6) presses against the first end plate, the oil discharge groove (23) connects spaces in the tank body on both sides of the separator piston (2), and an oil outlet gap (8) is located between the support frame (6) and the first end plate.

2. The piston-type oil tank with safety valve according to claim 1, wherein a return spring (24) is sleeved on the safety valve core (5) between the support frame (6) and the separator piston (2).

3. The piston-type oil tank with safety valve according to claim 2, wherein the safety valve core (5) is provided with a sealing ring (13) on the section between the stop plate (7) and the oil discharge groove (23),
when the separator piston (2) moves toward the support frame (6), the sealing ring (13) moves out of the separator piston (2), the end of the separator piston (2) facing the first end plate is provided with a diameter-expanding hole (9) at a gap between the safety valve core (5) and the separator piston (2), and an inner diameter of the diameter-expanding hole (9) gradually decreases from the stop plate (7) toward the support frame (6).

4. The piston-type oil tank with safety valve according to claim 3, wherein the second end plate of the tank body (1) is a rear cap plate (10), and the air outlet (4) is arranged on the rear cap plate (10), the side of the rear cap plate (10) facing the separator piston (2) is provided with a positioning ring (11) matching the inner wall of the tank body (1), the side of the separator piston (2) facing the rear cap plate (10) is provided with a rear support ring (12) resting on the positioning ring (11), and an inner diameter of the rear support ring (12) exceeds an outer diameter of the support frame (6).

5. The piston-type oil tank with safety valve according to claim 4, wherein the first end plate of the tank body (1) is a front cap plate (14), and the oil inlet (3) is arranged on the front cap plate (14), a side of the front cap plate (14) is provided with a mounting base (15) for installing the tank body (1) on a riveting tool, the oil inlet (3) extends outward from the mounting base (15) into the tank body (1), and the front cap plate (14) is provided with an oil replenishing inlet (21) connected with the tank body (1), and an oil replenishing plug (22) is disposed in the oil replenishing inlet (21).

6. The piston-type oil tank with safety valve according to claim 5, wherein a sealing tube base (16) is arranged between the tank body (1) and the front cap plate (14), and a tightening rod (17) connects the front cap plate (14) and the rear cap plate (10).

7. The piston-type oil tank with safety valve according to claim 6, wherein the side of the sealing tube base (16) facing the separator piston (2) is contains a sleeve ring (18) matching the inner wall of the tank body (1), the end face of the separator piston (2) facing the front cap plate (14) is provided with a front support ring (19) resting on the sleeve ring (18).

8. The piston-type oil tank with safety valve according to claim 6, wherein a magnet (25) is provided on the side of the safety valve core (5) facing the front cap plate (14), and a sensor (26) for detecting the position of the magnet (25) is provided on the front cap plate (14).

9. A riveting tool, comprising the piston-type oil tank with safety valve according to claim 1, and a pump body (20), wherein the tank body (1) is in fluid connection with the pump body (20), the tank body (1) comprises a front cap plate (14), an oil inlet (3) is arranged on the front cap plate (14), and a mounting base (15) is provided on the front cap plate (14), and the mounting base (15) is connected to the pump body (20).

* * * * *